(12) United States Patent
Lin

(10) Patent No.: US 10,567,196 B2
(45) Date of Patent: Feb. 18, 2020

(54) DECISION COORDINATION METHOD, EXECUTION APPARATUS, AND DECISION COORDINATOR

(71) Applicant: Huawei Technologies Co., Ltd., Shenzhen (CN)

(72) Inventor: Yangbo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 15/481,751

(22) Filed: Apr. 7, 2017

(65) Prior Publication Data

US 2017/0214544 A1 Jul. 27, 2017

Related U.S. Application Data

(63) Continuation of application No. PCT/CT2015/080241, filed on May 29, 2015.

(30) Foreign Application Priority Data

Oct. 10, 2014 (CN) .......................... 2014 1 0529933

(51) Int. Cl.
*H04L 12/46* (2006.01)
*H04L 12/24* (2006.01)
(Continued)

(52) U.S. Cl.
CPC .......... *H04L 12/46* (2013.01); *G06F 9/45558* (2013.01); *G06F 9/5038* (2013.01);
(Continued)

(58) Field of Classification Search
None
See application file for complete search history.

(56) References Cited

U.S. PATENT DOCUMENTS 9,697,120 B2 * 7/2017 Macpherson ............. G06F 9/06
2003/0126260 A1 7/2003 Husain et al.
(Continued)

FOREIGN PATENT DOCUMENTS

CN 102081754 A 6/2011
CN 102655532 A 9/2012
(Continued)

OTHER PUBLICATIONS

Huawei Technologies (UK) et al., "Missed consistency clarifications for B.5 and C.5," input for Committee NFV MAN, Meeting & Allocation NFVMAN#75, Submitted Jul. 22, 2014, pp. 1-45.
(Continued)

*Primary Examiner* — Davoud A Zand
(74) *Attorney, Agent, or Firm* — Slater Matsil, LLP

(57) ABSTRACT

Embodiments disclose a decision coordination method and an apparatus. The method includes: receiving a decision coordination request message from an execution part in a Network Functions Virtualization system, where the decision coordination request message includes a to-be-coordinated decision. The method also includes determining a coordinated decision according to the to-be-coordinated decision. The method also includes sending a decision coordination response message to the execution part, where the decision coordination response message includes the coordinated decision, and the decision coordination response message is used to instruct the execution part to execute the coordinated decision.

19 Claims, 4 Drawing Sheets

(51) Int. Cl.
  *G06F 9/455* (2018.01)
  *G06F 9/50* (2006.01)
  *H04W 48/14* (2009.01)
  *H04W 48/18* (2009.01)
  *H04W 88/06* (2009.01)

(52) U.S. Cl.
  CPC ........ *G06F 9/5077* (2013.01); *H04L 41/0896* (2013.01); *H04L 41/5054* (2013.01); *H04W 48/14* (2013.01); *H04W 48/18* (2013.01); *H04W 88/06* (2013.01); *G06F 2009/45595* (2013.01)

(56) References Cited

U.S. PATENT DOCUMENTS

| | | | |
|---|---|---|---|
| 2014/0245297 A1 | 8/2014 | Hackett et al. | |
| 2016/0359805 A1* | 12/2016 | Spraggs | H04L 41/0806 |
| 2017/0031699 A1* | 2/2017 | Banerjee | G06F 9/45558 |
| 2017/0104839 A1* | 4/2017 | Starsinic | H04L 67/2842 |
| 2017/0231020 A1* | 8/2017 | Tomici | H04L 63/0892 |
| 2018/0063083 A1* | 3/2018 | Tsirkin | H04L 63/0245 |
| 2018/0114013 A1* | 4/2018 | Sood | G06F 21/53 |

FOREIGN PATENT DOCUMENTS

| | | |
|---|---|---|
| CN | 103179642 A | 6/2013 |
| CN | 103974387 A | 8/2014 |

OTHER PUBLICATIONS

ETSI, "Network Function Virtualization (NFV); Management and Orchestration," GS abc xxx, v0.0.0 (Feb. 2013), Reference DGS-NFVMAN-001, pp. 1-46.

ETSI, "Network Functions Virtualisations (NFV); Architectural Framework," ETSI GS NFV 002 V1.1.1 (Oct. 2013), Group Specification, 21 pages.

ETSI, "Network Functions Virtualisations (NFV); Use Cases," ETSI GS NFV 001 V1.1.1, (Oct. 2013), Group Specification, 50 pages.

Chiosi, M. et al., "Network Functions Virtualisation, an Introduction, Benefits, Enablers, Challenges & Call for Action," Network Functions Virtualisation—Introductory White Paper, Issue 1, SDN and OpenFlow World Congress, Darmstadt, Germany, Oct. 22-24, 2012, 16 pages.

* cited by examiner

DECISION COORDINATION METHOD, EXECUTION APPARATUS, AND DECISION COORDINATOR

CROSS-REFERENCE TO RELATED APPLICATIONS

This application is a continuation of International Application No. PCT/CN2015/080241, filed on May 29, 2015, which claims priority to Chinese Patent Application No. 201410529933.X, filed on Oct. 10, 2014. The disclosures of the aforementioned applications are hereby incorporated by reference in their entireties.

TECHNICAL FIELD

The present invention relates to the Network Functions Virtualization field, and more specifically, to a decision coordination method in a Network Functions Virtualization system, an execution apparatus, and a decision coordinator.

BACKGROUND

Network Functions Virtualization (NFV) aims to consolidate many network equipment types onto industry-standard high-volume servers, switches, and storage devices by using a virtualization technology in the evolving Information Technology (IT) field, thereby changing a manner in which a network operator builds and operates a network and a network service (NS). The NFV implements a network function by using software that can run on a series of industry-standard server hardware, thereby changing a network infrastructure. Moreover, because the software can move dynamically or be instantiated in different network locations according to a requirement without installing a new device, a network operation is further changed.

Referring to FIG. 1, FIG. 1 is a schematic diagram of a system architecture of an NFV system 100 that can be applied in embodiments of the present invention. The NFV system may be implemented by using multiple types of networks, such as a data center network, a service provider network, or a Local Area Network (LAN). As shown in FIG. 1, the NFV system may include an NFV management and orchestration system (MANO) 128, an NFV infrastructure (NFVI) 130, multiple virtualized network functions (VNF) 108, multiple element management systems (EMS) 122, a Service, VNF and Infrastructure Description system 126, and one or more operation support systems/business support systems (OSS/BSS) 124.

The NFV MANO 128 may include an NFV orchestrator (NFVO) 102, one or more VNF managers (VNFM) 104, and one or more virtualized infrastructure managers (VIM) 106. The NFVI 130 may include a hardware resource layer including computing hardware 112, storage hardware 114, and network hardware 116, a virtualization layer, and a virtual resource layer including virtual computing 110 (such as a virtual machine), virtual storage 118, and a virtual network 120. The computing hardware 112 may be a dedicated processor or a general processor configured to provide processing and computing functions. The storage hardware 114 is configured to provide a storage capability, and the storage capability may be provided by the storage hardware 114 itself (such as a local memory of a server), or may be provided by using a network (for example, a server connects to a network storage device by using a network). The network hardware 116 may be a switch, a router, and/or another network device, the network hardware 116 is configured to implement communication among multiple devices, and the multiple devices are in a wireless or wired connection. The virtualization layer in the NFVI 130 is used to abstract a hardware resource at the hardware resource layer and decouple the VNF 108 from a physical layer to which the hardware resource belongs, to provide the VNF with a virtual resource. As shown in FIG. 1, the virtual resource may include the virtual computing 110, the virtual storage 118, and the virtual network 120. The virtual computing no and the virtual storage 118 may be provided to the VNF 108 in a form of a virtual machine or another virtual container. For example, one or more VNFs 108 may be deployed in a virtual machine. The virtualization layer forms the virtual network 120 by abstracting the network hardware 116. The virtual network 120, such as a virtual switch (Vswitches), is used to implement communication among multiple virtual machines or multiple other types of virtual containers carrying the VNF. Network hardware virtualization may be implemented by using a virtual LAN (VLAN), a virtual private LAN service (VPLS), a virtual extensible local area network (VxLAN), Network Virtualization using Generic Routing Encapsulation (NVGRE), or another technology. The OSS/BSS 124 mainly targets a telecom service operator, and provides comprehensive network management and service operation functions including network management (such as fault monitoring and network information collecting), charging management, customer service management, and the like. The VNF and infrastructure description system 126 is described in detail in an ETSI GS NFV 002 v1.1.1 standard, and details are not described in the embodiments of the present invention.

The NFV MANO 128 may be used to implement monitoring and managing of the VNF 108 and the NFVI 130. The NFVO 102 is mainly responsible for NS lifecycle management to implement a network service orchestration function, and for NFVI resource orchestration across multiple VIMs to implement a resource orchestration function. The NFVO may communicate with one or more VNFMs 104, so as to implement a resource-related request, send configuration information to the VNFM 104, and collect status information of the VNF 108. In addition, the NFVO 102 may further communicate with the VIM 106, so as to implement resource allocation and/or reserve and exchange configuration information and status information of the virtualized hardware resource. The VNFM 104 may be configured to manage one or more VNFs 108 and implement various management functions, for example, initializing, updating, querying, and/or terminating the VNF 108. The VIM 106 may be used to control and manage an interaction between the VNF 108 and each of the computing hardware 112, the storage hardware 114, the network hardware 116, the virtual computing 110, the virtual storage 118, and the virtual network 120. For example, the VIM 106 may be configured to perform a resource allocation operation on the VNF 108. The VNFM 104 and the VIM 106 may communicate with each other to exchange the configuration and status information of the virtualized hardware resource.

The NFVI 130 includes hardware and software, and the hardware and software collectively build a virtualization environment to deploy, manage, and implement the VNF 108. In other words, the hardware resource layer and the virtual resource layer are used to provide a virtual resource to the VNF 108, such as a virtual machine or a virtual container in another form.

As shown in FIG. 1, the VNFM 104 may communicate with the VNF 108 and the EMS 122, so as to perform VNF lifecycle management and exchange configuration/status information. The VNF 108 is virtualization of at least one network function, and the network function is previously provided by a physical network device. In an implementation manner, the VNF 108 may be a virtualized mobility management entity (MME) node used to provide all network functions provided by a typical non-virtualized MME device. In another implementation manner, the VNF 108 may be configured to implement functions of some components among all components provided on a non-virtualized MME device. One or more VNFs 108 can be deployed on one virtual machine (or a virtual container in another form). The EMS 122 may be configured to manage one or more VNFs.

NFV policy management refers to management of rules governing different NFV functions (such as a VNF or NS scaling operation, access control, resource management, and fault management). A policy is defined with a condition and a corresponding action. For example, a scaling policy may state to execute a related action (for example, scale down a VNF) if a required condition (for example, relatively low resource usage of the VNF) is met.

The NFVO, the VNFM, and the VIM in the NFV MANO provide a policy management interface to the OSS/BSS, the NFVO, and the NFVO respectively, so as to allow an authorized entity or function block to manage an NFV policy. An interface exposed by the NFVO provides support for managing policies related to an NS instance, a VNF instance, and an NFVI resource (such as authorization/access control and resource reserving/layout/allocation). Interfaces exposed by the VNFM and the VIM provide support for managing policies related to VNF and NFVI resources respectively to meet a requirement of the NFVO. An operation that can be performed on these interfaces includes creating, updating, deleting, querying, activating, and deactivating a policy, and the like.

Using VNF instance scaling as an example, although a scaling operation on a VNF instance is performed by the VNFM, a scaling decision may be made by the OSS/BSS, the EMS, the NFVO, the VNFM, or the VIM based on a given policy. The deciding process of the OSS/BSS, the EMS, the NFVO, the VNFM, or the VIM may be triggered by a monitoring function performed by itself, or may be triggered by an event detection and reporting function of another entity or function block. For example, the VIM may be triggered into a scaling decision process because of factors such as network congestion and a quantity of sessions, the VNFM may be triggered into a scaling decision process because of factors such as VNF resource usage, the NFVO may be triggered into a scaling decision process because of factors such as resource orchestration, the EMS may be triggered into a scaling decision process because of factors such as inter-VNF management, and the OSS/BSS may be triggered into a scaling decision process because of factors such as inter-EMS management, or only because of an operation and maintenance plan. Then, the OSS/BSS, the EMS, the NFVO, the VNFM, or the VIM determines whether a condition defined in the given policy is met, and determines whether to initiate implementation of a defined action. Finally, the scaling decision made by the OSS/BSS, the EMS, the NFVO, the VNFM, or the VIM is sent to the VNFM for execution.

It can be learned from the foregoing that in an NFV system, an execution part may receive to-be-executed decisions sent by multiple parts (including the execution part itself) in the NFV system, and due to lack of a sound decision coordination mechanism, the execution part can only rigidly execute these decisions one by one, which is inflexible.

SUMMARY

Embodiments of the present invention provide a decision coordination method, an execution apparatus, and a decision coordinator, so as to improve flexibility of executing a decision by an execution part.

A first aspect provides a decision coordination method. The method includes receiving a decision coordination request message from an execution part in a Network Functions Virtualization system, where the decision coordination request message includes a to-be-coordinated decision. The method also includes determining a coordinated decision according to the to-be-coordinated decision. The method also includes sending a decision coordination response message to the execution part, where the decision coordination response message includes the coordinated decision, and the decision coordination response message is used to instruct the execution part to execute the coordinated decision.

With reference to the first aspect, in an implementation manner of the first aspect, the to-be-coordinated decision is one or more decisions for a target operation, and the coordinated decision is one final decision for the target operation; and the determining a coordinated decision according to the to-be-coordinated decision includes: determining the final decision according to the one or more decisions.

In another implementation manner of the first aspect, the multiple decisions are generated by multiple decision parts in the Network Functions Virtualization system, and the decision coordination request message further includes identifiers of the multiple decision parts; before the determining the final decision according to the multiple decisions, the method further includes: determining a highest-priority decision part among the multiple decision parts according to a correspondence between the identifiers of the multiple decision parts and priorities of the multiple decision parts; and the determining the final decision according to the multiple decisions includes: determining a decision among the multiple decisions that is generated by the highest-priority decision part as the final decision.

In a implementation manner of the first aspect, the decision coordination request message further includes a sequence for obtaining the multiple decisions by the execution part; and the determining the final decision according to the multiple decisions includes: determining, based on the sequence, a first-obtained or last-obtained decision of the multiple decisions as the final decision.

In an implementation manner of the first aspect, the to-be-coordinated decision is a decision for a target operation; before the determining a coordinated decision according to the to-be-coordinated decision, the method further includes: obtaining correlation information of the target operation from the Network Functions Virtualization system; and the determining a coordinated decision according to the to-be-coordinated decision includes: determining the coordinated decision according to the to-be-coordinated decision and the correlation information.

In an implementation manner of the first aspect, the determining the coordinated decision according to the to-be-coordinated decision and the correlation information includes: determining the coordinated decision by means of big data analytics and according to the to-be-coordinated decision and the correlation information.

With reference to any one of the first aspect or the foregoing implementation manners, in another implementation manner of the first aspect, the sending a decision coordination response message to the execution part further includes sending decision coordination failure information to the execution part when the coordinated decision is not determined.

In an implementation manner of the first aspect, the to-be-coordinated decision is generated based on a preset policy by the decision part in the Network Functions Virtualization system.

In an implementation manner of the first aspect, the decision coordination request message further includes an identifier of the decision part that makes the to-be-coordinated decision.

In an implementation manner of the first aspect, the decision part is a network functions virtualization orchestrator, a virtualized network function manager, a virtualized infrastructure manager, an element management system, or an operation support system or a business support system.

In an implementation manner of the first aspect, the execution part is a network functions virtualization orchestrator, a virtualized network function manager, a virtualized infrastructure manager, an element management system, or an operation support system or a business support system.

A second aspect provides a decision coordination method. The method includes obtaining a to-be-coordinated decision. The method also includes sending a decision coordination request message to a decision coordinator in the Network Functions Virtualization system, where the decision coordination request message includes the to-be-coordinated decision, and the decision coordination request message is used to instruct the decision coordinator to determine a coordinated decision according to the to-be-coordinated decision. The method also includes receiving a decision coordination response message from the decision coordinator, where the decision coordination response message includes the coordinated decision.

In an implementation manner of the second aspect, the method further includes: determining feasibility of the coordinated decision; and executing the coordinated decision when the coordinated decision is feasible; or skipping executing the coordinated decision when the coordinated decision is infeasible.

In an implementation manner of the second aspect, the to-be-coordinated decision is a decision for a target operation; and the determining feasibility of the coordinated decision includes: obtaining correlation information of the target operation, and determining the feasibility of the coordinated decision according to the correlation information.

In an implementation manner of the second aspect, the to-be-coordinated decision is generated based on a preset policy by a decision part in the Network Functions Virtualization system.

In an implementation manner of the second aspect, after the executing the coordinated decision, the method further includes: sending indication information to the decision part that makes the to-be-coordinated decision, where the indication information is used to indicate an execution result of the coordinated decision.

In an implementation manner of the second aspect, the decision coordination request message further includes an identifier of the decision part that makes the to-be-coordinated decision.

A third aspect provides a decision coordinator. The decision coordinator includes a receiving unit, configured to receive a decision coordination request message from an execution part in a Network Functions Virtualization system, where the decision coordination request message includes a to-be-coordinated decision. The decision coordinator also includes a first determining unit, configured to determine a coordinated decision according to the to-be-coordinated decision received by the receiving unit. The decision coordinator also includes a sending unit, configured to send a decision coordination response message to the execution part, where the decision coordination response message includes the coordinated decision determined by the first determining unit, and the decision coordination response message is used to instruct the execution part to execute the coordinated decision.

In an implementation manner of the third aspect, the to-be-coordinated decision is one or more decisions for a target operation, and the coordinated decision is one final decision for the target operation; and the first determining unit is specifically configured to determine the final decision according to the one or more decisions received by the receiving unit.

In an implementation manner of the second aspect, the multiple decisions are generated by multiple decision parts in the Network Functions Virtualization system, and the decision coordination request message further includes identifiers of the multiple decision parts; the decision coordinator further includes: a second determining unit, configured to determine a highest-priority decision part among the multiple decision parts according to a correspondence between the identifiers of the multiple decision parts and priorities of the multiple decision parts; and the first determining unit is specifically configured to determine a decision that is among the multiple decisions received by the receiving unit and that is generated by the highest-priority decision part as the final decision.

In an implementation manner of the third aspect, the decision coordination request message further includes a sequence for obtaining the multiple decisions by the execution part; and the first determining unit is specifically configured to determine, based on the sequence, a first-obtained or last-obtained decision of the multiple decisions as the final decision.

In an implementation manner of the third aspect, the to-be-coordinated decision is a decision for a target operation; the decision coordinator further includes: an obtaining unit, configured to obtain correlation information of the target operation from another part except the execution part in the Network Functions Virtualization system; and the first determining unit is specifically configured to determine the coordinated decision according to the to-be-coordinated decision and the correlation information.

In an implementation manner of the third aspect, the first determining unit is specifically configured to determine the coordinated decision by means of big data analytics and according to the to-be-coordinated decision and the correlation information.

In an implementation manner of the third aspect, the sending unit is further configured to send decision coordination failure information to the execution part when the coordinated decision is not determined.

In an implementation manner of the third aspect, the to-be-coordinated decision is generated based on a preset policy by the decision part in the Network Functions Virtualization system.

In an implementation manner of the third aspect, the decision coordination request message further includes an identifier of the decision part that makes the to-be-coordinated decision.

In an implementation manner of the third aspect, the decision part is a network functions virtualization orchestrator, a virtualized network function manager, a virtualized infrastructure manager, an element management system, or an operation support system or a business support system.

In an implementation manner of the third aspect, the execution part is a network functions virtualization orchestrator, a virtualized network function manager, a virtualized infrastructure manager, an element management system, or an operation support system or a business support system.

A fourth aspect provides an execution part. The execution part also includes an obtaining unit, configured to obtain a to-be-coordinated decision. The execution part also includes a first sending unit, configured to send a decision coordination request message to a decision coordinator in the Network Functions Virtualization system, where the decision coordination request message includes the to-be-coordinated decision obtained by the obtaining unit, and the decision coordination request message is used to instruct the decision coordinator to determine a coordinated decision according to the to-be-coordinated decision. The execution part also includes a receiving unit, configured to receive a decision coordination response message from the decision coordinator, where the decision coordination response message includes the coordinated decision.

In an implementation manner of the fourth aspect, the execution part further includes: a determining unit, configured to determine feasibility of the coordinated decision; and an execution unit, configured to execute the coordinated decision when the coordinated decision is feasible, or skip executing the coordinated decision when the coordinated decision is infeasible.

In an implementation manner of the fourth aspect, the to-be-coordinated decision is a decision for a target decision; and the determining unit is specifically configured to obtain correlation information of the target operation and determine the feasibility of the coordinated decision according to the correlation information.

In an implementation manner of the fourth aspect, the to-be-coordinated decision is generated based on a preset policy by the decision part in the Network Functions Virtualization system.

In an implementation manner of the fourth aspect, the execution part further includes: a second sending unit, configured to send indication information to the decision part that makes the to-be-coordinated decision, where the indication information is used to indicate an execution result of the coordinated decision.

In an implementation manner of the fourth aspect, the decision coordination request message further includes an identifier of the decision part that makes the to-be-coordinated decision.

A decision coordinator is introduced to the embodiments of the present invention, and by using the decision coordinator, an execution part determines a coordinated decision from a to-be-coordinated decision, so that only the coordinated decision needs to be executed, which is more flexible compared with the prior art.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

In the embodiments of the present invention, a decision coordinator, or referred to as a policy-based decision coordinator (PDC), is introduced to the NFV field, and the decision coordinator is responsible for coordinating a decision obtained by an execution part. The decision may be a decision made by the execution part based on a given policy, or may be a decision made by another part in an NFV system based on a policy made by the another part itself. The decision coordinator may be an independent entity or function block, or may be a component in another entity or function block, for example, deployed in an NFVO and serving as one of NFVO functions.

Figure 2:
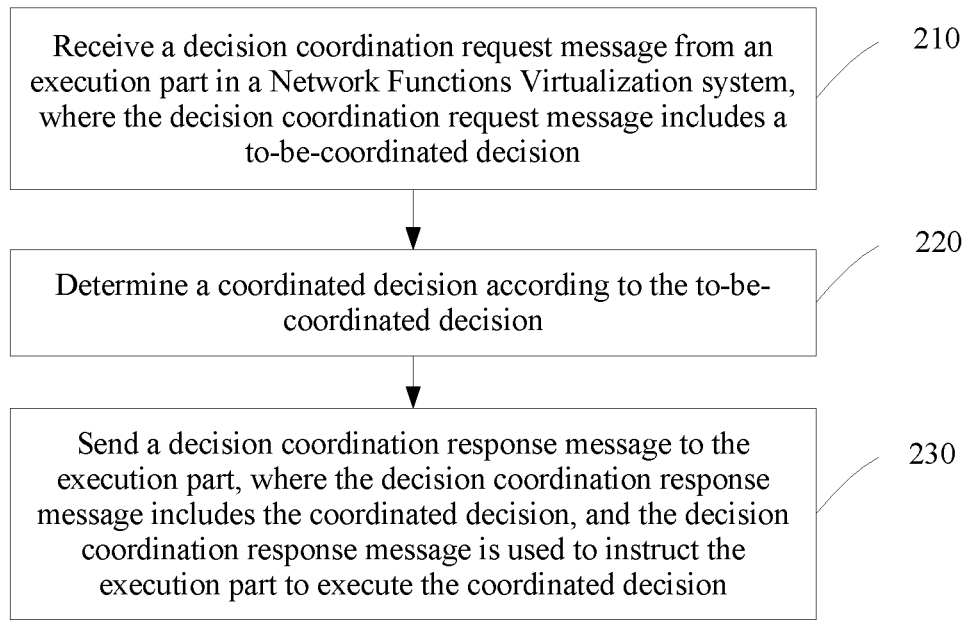
FIG. 2 is a schematic flowchart of a decision coordination method according to an embodiment of the present invention.

FIG. 2 is a schematic flowchart of a decision coordination method according to an embodiment of the present invention. The method in FIG. 2 is executed by a decision coordinator, and the method in FIG. 2 includes the following steps.

210. Receive a decision coordination request message from an execution part in a Network Functions Virtualization system, where the decision coordination request message includes a to-be-coordinated decision.

Figure 1:
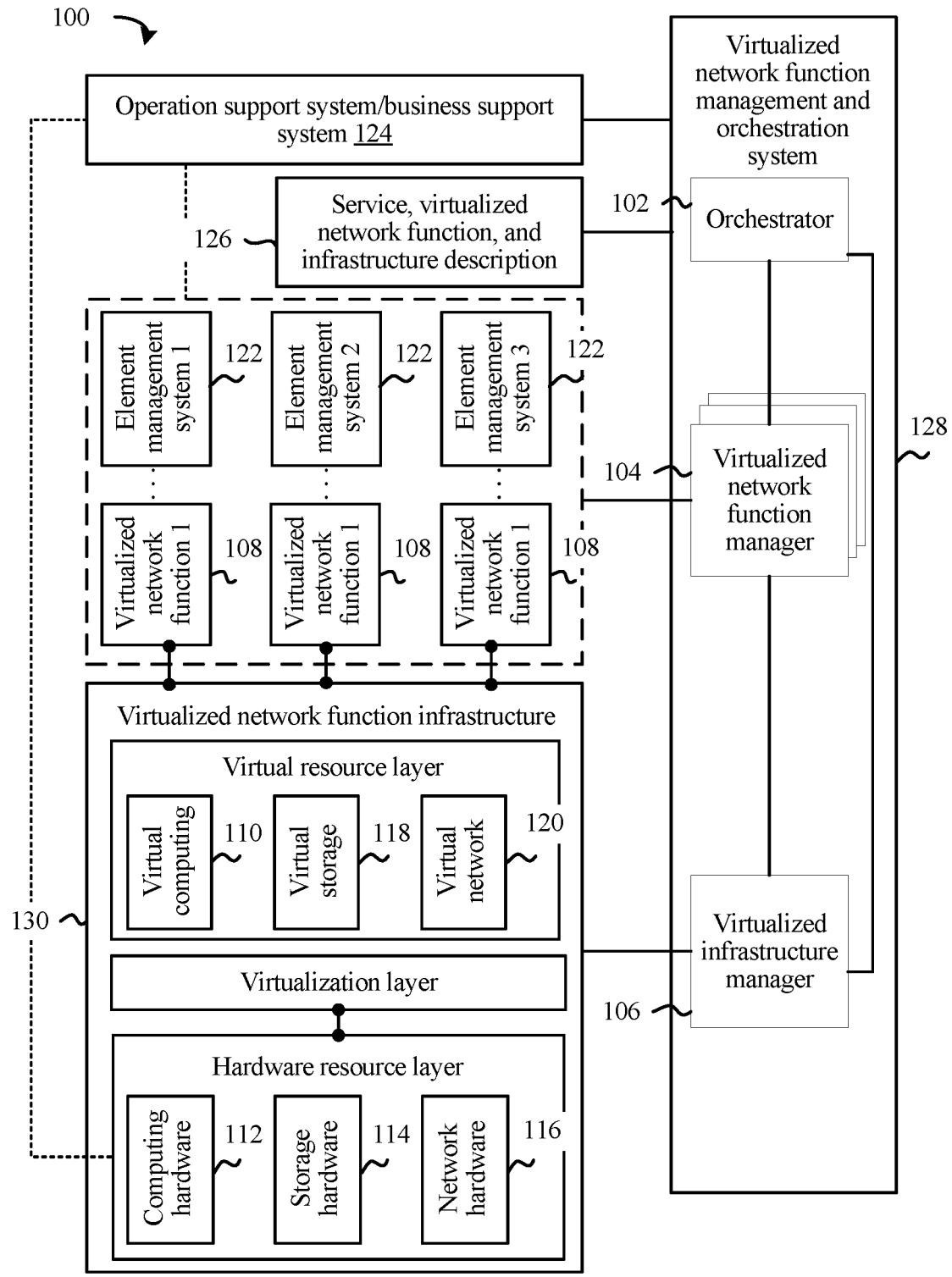
FIG. 1 is a framework diagram of an NFV system.

It should be understood that the foregoing execution part may be any part (or referred to as an entity or a function block) in an NFV system, for example, may be the NFVO 102, the VNFM 104, the VIM 106, the EMS 122, or the OSS/BSS 124 in FIG. 1.

It should be noted that the execution part is responsible for performing one or more operations in the NFV system, or in other words, the execution part is responsible for implementing one or more functions in the VFN system. One decision may be for one operation (or function), or in other words, one decision indicates a manner for performing one operation by the execution part. For example, when the execution part is a VNFM, the VNFM is responsible for performing a VNF scaling operation, and a decision for the VNF scaling operation may be: scaling down a VNF by 50%, or scaling up a VNF by 40%. For another example, the execution part is an NFVO, the NFVO is responsible for operations including an NS scaling operation, and a decision for the NS scaling operation may be: scaling down an NS by 50%, or scaling up an NS by 40%. It should be understood that the scaling down or up a VNF or an NS may refer to scaling down or up a scale of the VNF or the NS, and further, may refer to increasing or decreasing resources occupied by the VNF or the NS.

The foregoing to-be-coordinated decision may be one decision, or may be multiple decisions, and these decisions may be decisions for a same operation of the execution part, or may be decisions for different operations of the execution part. In other words, the execution part may apply to the decision coordinator for coordinating each decision execution request, or may apply to the decision coordinator for coordination when simultaneously requested by multiple parties (such as any combination of an OSS/BSS, an EMS, a VNFM, or a VIM), and accordingly, information related to a request of each party should also be attached when coordination is applied for.

In addition, the to-be-coordinated decision may be a decision made by the execution part itself based on a given policy, or may be a decision that is generated by another part (or referred to as an entity or a function block) in the NFV system based on a policy made by the another part itself and that the execution part is requested to execute, that is, the execution part is a decision executor, but is not always a decision maker. For example, for the VNF scaling operation, the execution part may be the VNFM, and the to-be-coordinated decision may be a decision made by the VNFM itself; or the to-be-coordinated decision may be a decision made by another part (such as an OSS/BSS, an EMS, an NFVO, or a VIM), and then the decision is sent to a VNFM side by using an interface between the another part and the VNFM, so as to trigger (or request) the VNFM to execute the decision.

It should be further noted that no matter who makes the foregoing to-be-coordinated decision, the execution part itself or the another part in the NFV system (for ease of description, a part generating a decision is referred to as a decision maker in the following), there may be multiple manners for enabling a decision maker to make a corresponding decision. For example, the decision making process may be triggered by a monitoring function of the decision maker itself, or may be triggered by a reporting function of an event monitoring and reporting function of the another part. A decision for the VNF scaling operation is used as an example. The VNFM may monitor resource usage of the VNF, and when the resource usage of the VNF is less than a threshold, the VNFM makes a decision of performing a scaling-down operation on the VNF; or the VIM may monitor network congestion or a quantity of sessions, and when congestion occurs in a network, the VIM reports congestion-indication information to the VNFM, and based on the information, the VNFM makes a decision of performing a scaling-up operation on the VNF.

In addition, when receiving a request that is for executing a decision and that is sent by the another part, the execution part may first verify validity of the request, for example, whether a requester is authorized to send the request, and if the verification fails, a failure response is returned to the requester, and information such as a failure cause may be carried.

220. Determine a coordinated decision according to the to-be-coordinated decision.

It should be noted that the coordinated decision may be a decision selected from the to-be-coordinated decision, or may be a new decision generated based on the to-be-coordinated decision. The decision for the VNF scaling operation is used as an example. If the to-be-coordinated decision may include two decisions, a first decision instructs the VNFM to scale down a target VNF by 50%, and a second decision instructs the VNFM to scale down the target VNF by 60%, the coordinated decision may be either of the first decision and the second decision, or may be a new decision, and the new decision instructs the VNFM to scale down the target VNF by 55%.

It should be noted that an implementation manner of step 220 is not specifically limited in this embodiment of the present invention, and the decision coordinator may obtain the coordinated decision based on the to-be-coordinated decision and by using various data analysis and processing means or preset rules.

Optionally, in an embodiment, the to-be-coordinated decision is a decision for a target operation, and before 220, the method in FIG. 2 may further include: obtaining correlation information of the target operation from the Network Functions Virtualization system; and step 220 may include: determining the coordinated decision according to the to-be-coordinated decision and the correlation information.

It should be noted that a correlation information form, a manner for determining the coordinated decision according to the to-be-coordinated decision and the correlation information, and the like are not specifically limited in this embodiment of the present invention. In practice, any information related to the target operation may be used to analyze the coordinated decision. For example, the VNF scaling relates to information such as resources occupied by the VNF, and the information such as the resources occupied by the VNF may be obtained from the VIM. The VNF scaling may also lead to an NS adjustment, and information such as whether the VNF scaling is allowed or a scaling range of the VNF may be obtained from the NFVO. Further, there are various manners for determining the coordinated decision based on the to-be-coordinated decision and the correlation information. For example, if the to-be-coordinated decision is to scale down the VNF by 30%, and the correlation information indicates that the VNF can be scaled down by 20%, a smaller value of the two values may be selected. For another example, if the to-be-coordinated decision is to scale up the VNF by 50%, and the correlation information indicates a quantity of computing resources occupied by the VNF, the coordinated decision may be obtained based on a data analysis and predicting manner, such as big data analytics, probability analysis and predicting, or another manner.

The decision for the VNF scaling operation is used as an example. It is assumed that the to-be-coordinated decision is to enable the VNFM to scale up the target VNF by 50%. After receiving the to-be-coordinated decision, the decision coordinator can query correlation information of the target VNF, such as a current resource occupation status of the target VNF, from the VIM in the NFV system, and finds that the target VNF can be scaled up by a maximum of 30%. Therefore, the decision coordinator determines that the coordinated decision is to scale up the target VNF by 30%. For another example, if the decision coordinator queries the NFVO and finds that the target VNF is under management limitation and cannot be scaled up by more than 40%, the decision coordinator determines that the coordinated decision is to scale up the target VNF by 40%. It should be understood that the decision coordinator may query information such as a related resource status or management limitation after receiving the decision coordination request message, or may obtain, before receiving the decision coordination request message, the information by using an event monitoring and reporting function of the decision coordinator or another part. In addition, the decision coordinator may determine the coordinated decision based on the to-be-coordinated decision and by using various information analysis and predicting technologies including big data analytics.

The to-be-coordinated decision may further include multiple mutually conflicting decisions, and the decision coordinator may coordinate these mutually conflicting decisions based on a decision coordination rule to generate one final decision, thereby resolving a mutual conflict among the decisions obtained by the execution part. Subsequently, how to coordinate mutually conflicting decisions is described in detail with reference to a specific embodiment, and details are not described herein.

230. Send a decision coordination response message to the execution part, where the decision coordination response message includes the coordinated decision, and the decision coordination response message is used to instruct the execution part to execute the coordinated decision.

Optionally, before step 230, the decision coordinator may further send the coordinated decision to another related part in the NFV system, so as to determine feasibility of the coordinated decision. The decision for the VNF scaling operation is used as an example. It is assumed that the to-be-coordinated decision is generated by the VNFM itself and is to request for scaling down the target VNF by 10%, and the coordinated decision is also to scale down the target VNF by 10%. The decision coordinator may send the coordinated decision to the NFVO, so that the NFVO determines whether scaling down the target VNF by 10% is feasible. For example, if that the target VNF can be scaled down only by 5% is specified in an NS created by the NFVO, coordination made by the decision coordinator is infeasible, and the decision coordinator may make a new decision or return information such as a decision coordination failure to the VNFM. Further, a cause of the decision coordination failure may be further attached.

A decision coordinator is introduced to this embodiment of the present invention, and by using the decision coordinator, an execution part determines a coordinated decision from a to-be-coordinated decision, so that only the coordinated decision needs to be executed, which is more flexible compared with the prior art.

Optionally, in an embodiment, the to-be-coordinated decision is multiple decisions for a target operation, and the coordinated decision is one final decision for the target operation. The determining the coordinated decision according to the to-be-coordinated decision includes: determining the final decision according to the multiple decisions; and the sending a decision coordination response message to the execution part includes: sending the decision coordination response message to the execution part, where the coordination response message is used to instruct the execution part to execute an operation according to the final decision.

It should be understood that the multiple decisions for the target operation may be made by different parts based on different policies (or considering different factors). For example, a VIM may make a VNF scaling decision based on factors such as network congestion or a quantity of sessions; a VNFM may make a VNF scaling decision based on factors such as resource usage of the VNF; an NFVO may make a VNF scaling decision based on factors such as NS orchestration; an EMS may make a VNF scaling decision based on factors such as inter-VNF management; an OSS/BSS may make a VNF scaling decision based on factors such as inter-EMS management or an operation and maintenance plan. When the to-be-coordinated decision includes multiple decisions for the target operation, a phenomenon in which the decisions are inconsistent or in a mutual conflict may occur. In this embodiment of the present invention, the decisions for the target operation are converted into one final decision, which effectively resolves the mutual conflict among the decisions.

It should be noted that there may be multiple manners for resolving the mutual conflict among the decisions by the decision coordinator. The following provides two specific implementation manners, but this embodiment of the present invention is not limited thereto, and any conflict coordination solution that can convert multiple decisions into one decision shall fall within the protection scope of this embodiment of the present invention.

Optionally, in an implementation manner, the multiple decisions are generated by multiple decision parts in the Network Functions Virtualization system, and the decision coordination request message further includes identifiers of the multiple decision parts. Before the determining the final decision according to the multiple decisions, the method further includes: determining a highest-priority target part among the multiple decision parts according to a correspondence between the identifiers of the multiple decision parts and priorities of the multiple decision parts; and the determining the final decision according to the multiple decisions includes: determining a decision among the multiple decisions that is generated by the highest-priority target part as the final decision.

It should be understood that the decision part may be any part in the NFV system, or the decision part may be the execution part itself.

The decision for the VNF scaling operation is used as an example. It is assumed that the to-be-coordinated decision includes two decisions, a first decision is a decision made by the NFVO and is to request for scaling down the target VNF by 20%, and a second decision is a decision made by the VIM and is to request for scaling up the target VNF by 10%. A priority list of the parts in the NFV system is established in the decision coordinator in advance, and a priority of a VIM that manages lower-layer resources is higher than that of an NFVO that manages an NS. Therefore, the decision coordinator uses a decision of the VIM as the final decision, that is, scales up the target VNF by 10%.

Optionally, in an embodiment, the decision coordination request message further includes a sequence for obtaining the multiple decisions by the execution part; and the determining the final decision according to the multiple decisions includes: determining, based on the sequence, a first-obtained or last-obtained decision of the multiple decisions as the final decision.

It is assumed that the to-be-coordinated decision includes two decisions, and a time of obtaining a first decision by the VNFM is later than a time of obtaining a second decision. The VNFM may add information indicating an obtaining sequence of the two decisions (such as a decision obtaining time) to the decision coordination request message, and the decision coordinator may use the first-obtained decision as the final decision, or may use the last-obtained decision as the final decision.

Figure 3:
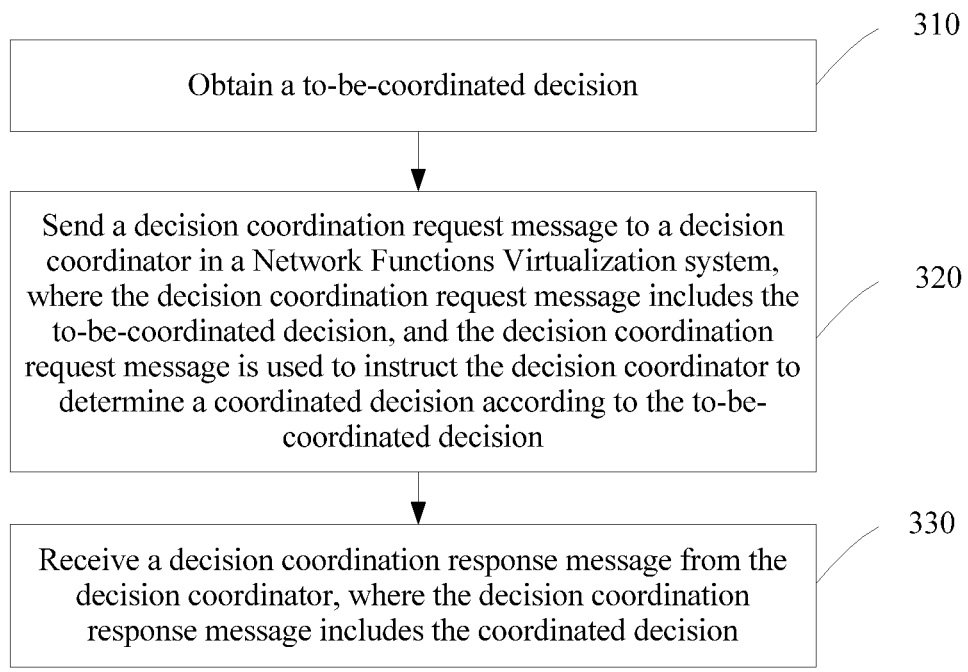
FIG. 3 is a schematic flowchart of a decision coordination method according to an embodiment of the present invention.

With reference to FIG. 2, the foregoing provides detailed description of the decision coordination method in the embodiment of the present invention from a decision coordinator side, and with reference to the FIG. 3, the following provides detailed description of a decision coordination method according to an embodiment of the present invention from a perspective of an execution part. It should be understood that functions of the decision coordinator and the execution part are corresponding to each other, and repeated description is appropriately omitted for the purpose of brevity.

FIG. 3 is a schematic flowchart of a decision coordination method according to an embodiment of the present invention. The method in FIG. 3 includes the following steps.

310. Obtain a to-be-coordinated decision.

320. Send a decision coordination request message to a decision coordinator in a Network Functions Virtualization system, where the decision coordination request message includes the to-be-coordinated decision, and the decision coordination request message is used to instruct the decision coordinator to determine a coordinated decision according to the to-be-coordinated decision.

330. Receive a decision coordination response message from the decision coordinator, where the decision coordination response message includes the coordinated decision.

When receiving the coordinated decision, an execution part may first verify validity of a source of the coordinated decision and feasibility of a parameter of the coordinated decision, for example, whether a coordination reply is corresponding to a coordination application; whether a scaling operation parameter can be supported by a resource status or under a management limitation; or the like.

The execution part may further return an execution result of the coordinated decision to a part that initially requests for executing the decision. A decision for a VNF scaling operation is used as an example. The to-be-coordinated decision is generated by an NFVO, and the NFVO requests a VNFM to execute the decision. The VNFM sends the to-be-coordinated decision to the decision coordinator to obtain the coordinated decision. The VNFM executes the coordinated decision, and then returns an execution result to the NFVO. If the execution fails, a failure response is returned to the NFVO, and information such as a failure cause may be further attached. If a degrading operation is performed, specific degrading operation information may be explicitly indicated in a returned result. For example, the NFVO requests for scaling down a target VNF by 50%, the VNFM performs a degrading operation based on the coordinated decision to scale down the target VNF by 40%, and the VNFM may return the parameter 40% used during the degrading operation to the NFVO.

A decision coordinator is introduced to this embodiment of the present invention, and by using the decision coordinator, an execution part determines a coordinated decision from a to-be-coordinated decision, so that only the coordinated decision needs to be executed, which is more flexible compared with the prior art.

Optionally, in an embodiment, the to-be-coordinated decision is multiple decisions for a target operation, the coordinated decision is one final decision for the operation, and step 340 may include: executing an operation according to the final decision.

It should be understood that the multiple decisions for the target operation may be made by different parts based on different policies (or by taking different factors into account). For example, a VIM may make a VNF scaling decision based on factors such as network congestion or a quantity of sessions; a VNFM may make a VNF scaling decision based on factors such as resource usage of the VNF; an NFVO may make a VNF scaling decision based on factors such as NS orchestration; an EMS may make a VNF scaling decision based on factors such as inter-VNF management; an OSS/BSS may make a VNF scaling decision based on factors such as inter-EMS management or an operation and maintenance plan. When the to-be-coordinated decision includes multiple decisions for the target operation, a phenomenon in which the decisions are inconsistent or in a mutual conflict may occur. In this embodiment of the present invention, the decisions for the target operation are converted into one final decision, which effectively resolves the mutual conflict among the decisions.

Optionally, in an embodiment, the method in FIG. 3 may further include: determining feasibility of the coordinated decision; and executing the coordinated decision when the coordinated decision is feasible; or skipping executing the coordinated decision when the coordinated decision is infeasible.

Optionally, in an embodiment, the method in FIG. 3 may further include: receiving coordination failure information sent by the decision coordinator. After receiving the coordination failure information, the execution part may skip executing the to-be-coordinated decision, or execute the to-be-coordinated decision in another manner, for example, according to a sequence.

Optionally, in an embodiment, the to-be-coordinated decision is a decision for the target operation, and the determining feasibility of the coordinated decision may include: obtaining correlation information of the target operation; and determining the feasibility of the coordinated decision according to the correlation information.

The decision for the VNF scaling operation is used as an example. The correlation information may include a current resource status of the VNF or management limitation information of the VNF, or include both of a current resource status of the VNF and management limitation information of the VNF.

Optionally, in an embodiment, the to-be-coordinated decision is generated based on a preset policy by a decision part in the Network Functions Virtualization system. After step 340, the method in FIG. 3 may further include: sending indication information to the decision part, where the indication information is used to indicate an execution result of the coordinated decision.

For example, the to-be-coordinated decision is generated by the NFVO and indicates scaling down the VNF by 40%, the coordinated decision indicates scaling down the VNF by 30%. After executing the decision, the VNFM returns a current resource occupation status of the VNF, and the like to the NFVO, so that the NFVO learns that the VNF is scaled down. The NFVO can determine from an execution result whether a degree to which the VNF is scaled down meets a requirement, and whether another decision of requesting for scaling down the VNF needs to be generated.

Optionally, in an embodiment, the to-be-coordinated decision is generated based on a preset policy by a decision part in the Network Functions Virtualization system, and the decision coordination request message further includes an identifier of the decision part.

It should be understood that sequence numbers of the foregoing processes do not mean execution sequences in various embodiments of the present invention. The execution sequences of the processes should be determined according to functions and internal logic of the processes, and should not impose as any limitation on the implementation processes of the embodiments of the present invention.

With reference to FIG. 1 to FIG. 3, the foregoing describes in detail the decision coordination method according to the embodiments of the present invention, and with reference to FIG. 4 to FIG. 7, the following describes in detail a decision coordinator and an execution part according to embodiments of the present invention.

Figure 4:
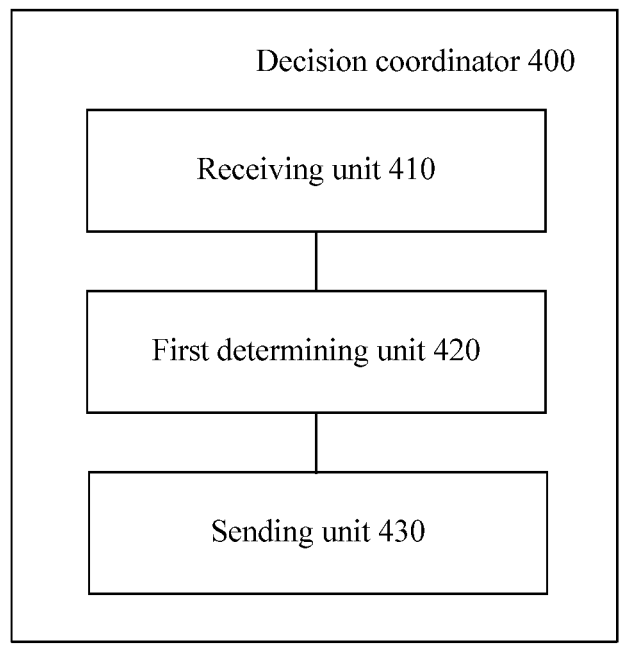
FIG. 4 is a schematic block diagram of a decision coordinator according to an embodiment of the present invention.

FIG. 4 is a schematic block diagram of a decision coordinator according to an embodiment of the present invention. A decision coordinator 400 in FIG. 4 can implement each step executed by the decision coordinator in FIG. 1 to FIG. 3, and repeated description is appropriately omitted to avoid repetition. The decision coordinator 400 includes a receiving unit 410, configured to receive a decision coordination request message from an execution part in a Network Functions Virtualization system, where the decision coordination request message includes a to-be-coordinated decision. The decision coordinator 400 also includes a first determining unit 420, configured to determine a coordinated decision according to the to-be-coordinated decision received by the receiving unit 410. The decision coordinator 400 also includes a sending unit 430, configured to send a decision coordination response message to the execution part, where the decision coordination response message includes the coordinated decision determined by the first determining unit 420, and the decision coordination response message is used to instruct the execution part to execute the coordinated decision.

A decision coordinator is introduced to this embodiment of the present invention, and by using the decision coordinator, an execution part determines a coordinated decision from a to-be-coordinated decision, so that only the coordinated decision needs to be executed, which is more flexible compared with the prior art.

Optionally, in an embodiment, the to-be-coordinated decision is one or more decisions for a target operation, the coordinated decision is one final decision for the target operation, and the first determining unit 420 is specifically configured to determine the final decision according to the one or more decisions.

Optionally, in an embodiment, the multiple decisions are generated by multiple decision parts in the Network Functions Virtualization system, and the decision coordination request message further includes identifiers of the multiple decision parts. The decision coordinator further includes: a second determining unit, configured to determine a highest-priority decision part among the multiple decision parts according to a correspondence between the identifiers of the multiple decision parts and priorities of the multiple decision parts. The first determining unit 420 is specifically configured to determine a decision among the multiple decisions that is generated by the highest-priority decision part as the final decision.

Optionally, in an embodiment, the decision coordination request message further includes a sequence for obtaining the multiple decisions by the execution part. The first determining unit 420 is specifically configured to determine, based on the sequence, a first-obtained or last-obtained decision of the multiple decisions as the final decision.

Optionally, in an embodiment, the to-be-coordinated decision is a decision for a target operation, and the decision coordinator further includes: an obtaining unit, configured to obtain correlation information of the target operation from another part except the execution part in the Network Functions Virtualization system. The first determining unit 420 is specifically configured to determine the coordinated decision according to the to-be-coordinated decision and the correlation information.

Optionally, in an embodiment, the first determining unit 420 is specifically configured to determine the coordinated decision by means of big data analytics and according to the to-be-coordinated decision and the correlation information.

Optionally, in an embodiment, the sending unit 430 is further configured to send decision coordination failure information to the execution part when the coordinated decision is not determined.

Optionally, in an embodiment, the to-be-coordinated decision is generated based on a preset policy by a decision part in the Network Functions Virtualization system.

Optionally, in an embodiment, the decision coordination request message further includes an identifier of the decision part that makes the to-be-coordinated decision.

Optionally, in an embodiment, the decision part is a network functions virtualization orchestrator, a virtualized network function manager, a virtualized infrastructure manager, an element management system, or an operation support system or a business support system.

Optionally, in an embodiment, the execution part is a network functions virtualization orchestrator, a virtualized network function manager, a virtualized infrastructure manager, an element management system, or an operation support system or a business support system.

Figure 5:
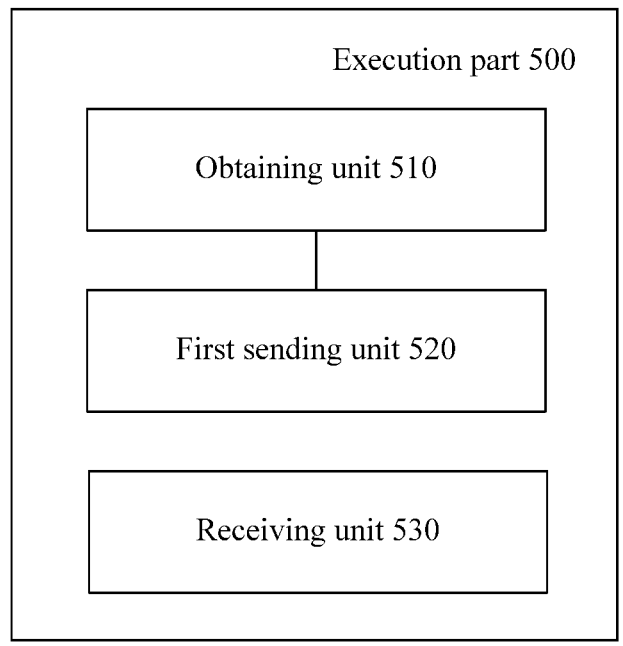
FIG. 5 is a schematic block diagram of an execution part according to an embodiment of the present invention.

FIG. 5 is a schematic block diagram of an execution part according to an embodiment of the present invention. It should be understood that an execution part 500 in FIG. 5 may also be referred to as an execution apparatus, and can implement each step executed by the execution part in FIG. 1 to FIG. 3, and repeated description is appropriately omitted to avoid repetition. The execution part 500 includes an obtaining unit 510, configured to obtain a to-be-coordinated decision. The execution part 500 also includes a first sending unit 520, configured to send a decision coordination request message to a decision coordinator in a Network Functions Virtualization system, where the decision coordination request message includes the to-be-coordinated decision obtained by the obtaining unit 510, and the decision coordination request message is used to instruct the decision coordinator to determine a coordinated decision according to the to-be-coordinated decision. The execution part 500 also includes a receiving unit 530, configured to receive a decision coordination response message from the decision coordinator, and the decision coordination response message includes the coordinated decision.

A decision coordinator is introduced to this embodiment of the present invention, and by using the decision coordinator, an execution part determines a coordinated decision from a to-be-coordinated decision, so that only the coordinated decision needs to be executed, which is more flexible compared with the prior art.

Optionally, in an embodiment, the execution part further includes: a determining unit, configured to determine feasibility of the coordinated decision; and an execution unit, configured to execute the coordinated decision when the coordinated decision is feasible, or skip executing the coordinated decision when the coordinated decision is infeasible.

Optionally, in an embodiment, the to-be-coordinated decision is a decision for a target operation; and the determining unit is specifically configured to obtain correlation information of the target operation and determine the feasibility of the coordinated decision according to the correlation information.

Optionally, in an embodiment, the to-be-coordinated decision is generated based on a preset policy by a decision part in the Network Functions Virtualization system.

Optionally, in an embodiment, the execution part further includes: a second sending unit, configured to send indication information to the decision part that makes the to-be-coordinated decision, and the indication information is used to indicate an execution result of the coordinated decision.

Optionally, in an embodiment, the receiving unit 530 further configured to receive coordination failure information sent by the decision coordinator. After receiving the coordination failure information, the execution part 500 may skip executing the to-be-coordinated decision, or execute the to-be-coordinated decision in another manner, for example, according to a sequence.

Optionally, in an embodiment, the to-be-coordinated decision is generated based on a preset policy by a decision part in the Network Functions Virtualization system, and the decision coordination request message further includes an identifier of the decision part that makes the to-be-coordinated decision.

Figure 6:
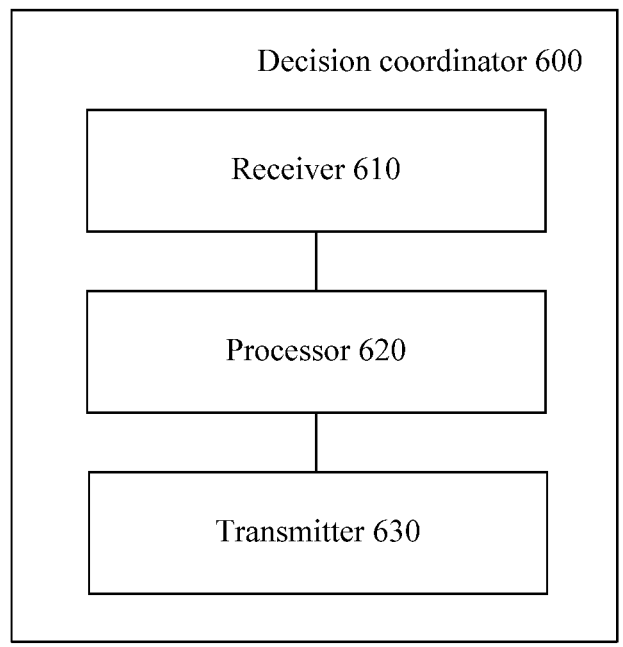
FIG. 6 is a schematic block diagram of a decision coordinator according to an embodiment of the present invention.

FIG. 6 is a schematic block diagram of a decision coordinator according to an embodiment of the present invention. A decision coordinator 600 in FIG. 6 can implement each step executed by the decision coordinator in FIG. 1 to FIG. 3, and repeated description is appropriately omitted to avoid repetition. The decision coordinator 600 includes a receiver 610, configured to receive a decision coordination request message from an execution part in a Network Functions Virtualization system, where the decision coordination request message includes a to-be-coordinated decision. The decision coordinator 600 also includes a processor 620, configured to determine a coordinated decision according to the to-be-coordinated decision. The decision coordinator 600 also includes a transmitter 630, configured to send a decision coordination response message to the execution part, where the decision coordination response message includes the coordinated decision, and the decision coordination response message is used to instruct the execution part to execute the coordinated decision.

A decision coordinator is introduced to this embodiment of the present invention, and by using the decision coordinator, an execution part determines a coordinated decision from a to-be-coordinated decision, so that only the coordinated decision needs to be executed, which is more flexible compared with the prior art.

Optionally, in an embodiment, the to-be-coordinated decision is one or more decisions for a target operation, the coordinated decision is one final decision for the target operation, and the processor 620 is specifically configured to determine the final decision according to the one or more decisions.

Optionally, in an embodiment, the multiple decisions are generated by multiple decision parts in the Network Functions Virtualization system, and the decision coordination request message further includes identifiers of the multiple decision parts. The processor 630 may be further configured to determine a highest-priority decision part among the multiple decision parts according to a correspondence between the identifiers of the multiple decision parts and priorities of the multiple decision parts. The processor 630 is specifically configured to determine a decision among the multiple decisions that is generated by the highest-priority decision part as the final decision.

Optionally, in an embodiment, the decision coordination request message further includes a sequence for obtaining the multiple decisions by the execution part; and the processor 630 is specifically configured to determine, based on the sequence, a first-obtained or last-obtained decision of the multiple decisions as the final decision.

Optionally, in an embodiment, the to-be-coordinated decision is a decision for a target operation, and the decision coordinator further includes: an obtaining unit, configured to obtain correlation information of the target operation from another part except the execution part in the Network Functions Virtualization system. The processor 630 is specifically configured to determine the coordinated decision according to the to-be-coordinated decision and the correlation information.

Optionally, in an embodiment, the processor 630 is specifically configured to determine the coordinated decision by means of big data analytics and according to the to-be-coordinated decision and the correlation information.

Optionally, in an embodiment, the transmitter 630 is further configured to send decision coordination failure information to the execution part when the coordinated decision is not determined.

Optionally, in an embodiment, the to-be-coordinated decision is generated based on a preset policy by a decision part in the Network Functions Virtualization system.

Optionally, in an embodiment, the decision coordination request message further includes an identifier of the decision part that makes the to-be-coordinated decision.

Optionally, in an embodiment, the decision part is a network functions virtualization orchestrator, a virtualized network function manager, a virtualized infrastructure manager, an element management system, or an operation support system or a business support system.

Optionally, in an embodiment, the execution part is a network functions virtualization orchestrator, a virtualized network function manager, a virtualized infrastructure manager, an element management system, or an operation support system or a business support system.

Figure 7:
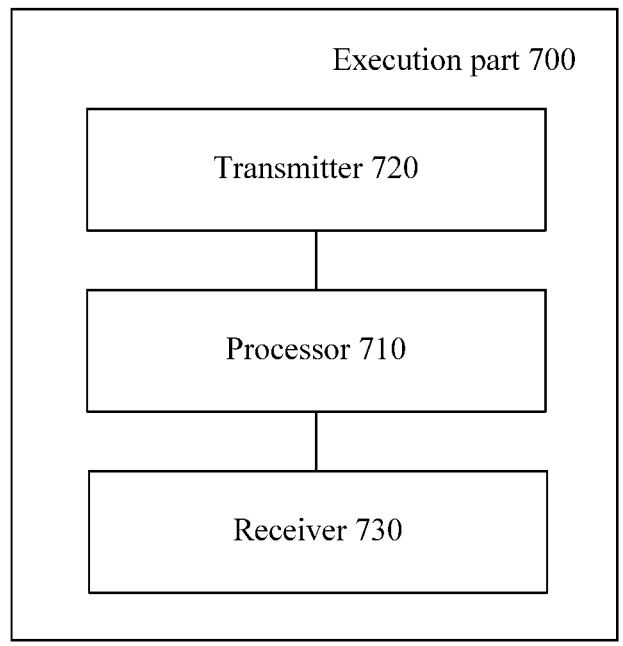
FIG. 7 is a schematic block diagram of an execution part according to an embodiment of the present invention.

FIG. 7 is a schematic block diagram of an execution part according to an embodiment of the present invention. It should be understood that an execution part 700 in FIG. 7 may also be referred to as an execution apparatus, and can implement each step executed by the execution part in FIG. 1 to FIG. 3, and repeated description is appropriately omitted to avoid repetition. The execution part 700 includes a processor 710, configured to obtain a to-be-coordinated decision. The execution part 700 also includes a transmitter 720, configured to send a decision coordination request message to a decision coordinator in a Network Functions Virtualization system, where the decision coordination request message includes the to-be-coordinated decision, and the decision coordination request message is used to instruct the decision coordinator to determine a coordinated decision according to the to-be-coordinated decision. The execution part 700 also includes a receiver 730, configured to receive a decision coordination response message from the decision coordinator, and the decision coordination response message includes the coordinated decision.

The processor 710 is further configured to execute the coordinated decision.

A decision coordinator is introduced to this embodiment of the present invention, and by using the decision coordinator, an execution part determines a coordinated decision from a to-be-coordinated decision, so that only the coordinated decision needs to be executed, which is more flexible compared with the prior art.

Optionally, in an embodiment, the processor 710 is further configured to determine feasibility of the coordinated decision. The processor 710 is specifically configured to execute the coordinated decision when the coordinated decision is feasible, or skip executing the coordinated decision when the coordinated decision is infeasible.

Optionally, in an embodiment, the to-be-coordinated decision is a decision for a target operation; and the determining unit is specifically configured to obtain correlation information of the target operation and determine the feasibility of the coordinated decision according to the correlation information.

Optionally, in an embodiment, the to-be-coordinated decision is generated based on a preset policy by a decision part in the Network Functions Virtualization system.

Optionally, in an embodiment, the transmitter 720 is further configured to send indication information to the decision part that makes the to-be-coordinated decision, and the indication information is used to indicate an execution result of the coordinated decision.

Optionally, in an embodiment, the decision coordination request message further includes an identifier of the decision part that makes the to-be-coordinated decision.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

What is claimed is:

1. A method, comprising:
receiving a decision coordination request message from a first entity in a Network Functions Virtualization system, wherein the decision coordination request message comprises a plurality of to-be-coordinated decisions for a target operation, and wherein to-be-coordinated decisions of the plurality of to-be-coordinated decisions are separately generated by different second entities of a plurality of second entities in the Network Functions Virtualization system;
determining a coordinated decision according to the plurality of to-be-coordinated decisions; and
sending a decision coordination response message to the first entity, wherein the decision coordination response message comprises the coordinated decision, and the decision coordination response message instructs the first entity to execute the coordinated decision.

2. The method according to claim 1, wherein the decision coordination request message further comprises identifiers of the plurality of second entities;
wherein the method further comprises:
determining a highest-priority second entity among the plurality of second entities according to a correspondence between the identifiers of the plurality of second entities and priorities of the plurality of second entities; and
wherein determining the coordinated decision comprises:
determining a decision that is generated by the highest-priority second entity as the coordinated decision.

3. The method according to claim 1, wherein the decision coordination request message further comprises a sequence for obtaining the plurality of to-be-coordinated decisions by the first entity; and
wherein determining the coordinated decision comprises:
determining, based on the sequence, a first-obtained or last-obtained decision of the plurality of to-be-coordinated decisions as the coordinated decision.

4. The method according to claim 1, further comprising:
obtaining correlation information of the target operation from the Network Functions Virtualization system; and
wherein determining the coordinated decision according to the plurality of to-be-coordinated decisions comprises:
determining the coordinated decision according to the plurality of to-be-coordinated decisions and the correlation information.

5. The method according to claim 4, wherein determining the coordinated decision according to the plurality of to-be-coordinated decisions and the correlation information comprises:
determining the coordinated decision using big data analytics and according to the plurality of to-be-coordinated decisions and the correlation information.

6. The method according to claim 1, wherein each of the plurality of to-be-coordinated decisions is generated based on a preset policy by a second entity in the Network Functions Virtualization system.

7. A method, comprising:
obtaining a plurality of to-be-coordinated decisions for a target operation, wherein to-be-coordinated decisions of the plurality of to-be-coordinated decisions are separately generated by different entities of a plurality of second entities in a Network Functions Virtualization system;
sending a decision coordination request message to a decision coordinator in a Network Functions Virtualization system, wherein the decision coordination request message comprises the plurality of to-be-coordinated decisions, and the decision coordination request message instructs the decision coordinator to determine a coordinated decision according to the plurality of to-be-coordinated decisions; and
receiving a decision coordination response message from the decision coordinator, wherein the decision coordination response message comprises the coordinated decision.

8. The method according to claim 7, further comprising:
obtaining correlation information of the target operation; and
determining a feasibility of the coordinated decision according to the correlation information;
executing the coordinated decision when the coordinated decision is feasible.

9. The method according to claim 7, wherein each of the plurality of to-be-coordinated decisions is generated based on a preset policy by a second entity in the Network Functions Virtualization system.

10. The method according to claim 7, wherein after executing the coordinated decision, the method further comprises:
sending indication information to a second entity of the plurality of second entities, wherein the indication information indicates an execution result of the coordinated decision.

11. A decision coordinator, comprising:
a receiver, configured to receive a decision coordination request message from a first entity in a Network Functions Virtualization system, wherein the decision coordination request message comprises a plurality of to-be-coordinated decisions for a target operation, wherein to-be-coordinated decisions of the plurality of to-be-coordinated decisions are separately generated by different entities of a plurality of second entities in the Network Functions Virtualization system;
a processor; and
a non-transitory computer-readable storage medium storing a program to be executed by the processor, the program including instructions for:
determining a coordinated decision according to the decision coordination request message comprising the plurality of to-be-coordinated decisions received by the receiver; and
a transmitter, configured to send a decision coordination response message to the first entity, wherein the decision coordination response message comprises the coordinated decision, and the decision coordination response message instructs the first entity to execute the coordinated decision.

12. The decision coordinator according to claim 11, wherein the decision coordination request message further comprises identifiers of the plurality of second entities;
wherein the program further includes instructions for:
determining a highest-priority second entity among the plurality of second entities according to a correspondence between the identifiers of the plurality of second entities and priorities of the plurality of second entities; and
determining a to-be-coordinated decision that is among the plurality of to-be-coordinated decisions received by the receiver and that is generated by the highest-priority second entity as the coordinated decision.

13. The decision coordinator according to claim 11, wherein the decision coordination request message further comprises a sequence for obtaining the plurality of to-be-coordinated decisions by the first entity; and
wherein the program further includes instructions for determining, based on the sequence, a first-obtained or last-obtained decision of the plurality of to-be-coordinated decisions as the coordinated decision.

14. The decision coordinator according to claim 11, wherein the plurality of to-be-coordinated decisions comprises a decision for a target operation; and
wherein the program further includes instructions for:
obtaining correlation information of the target operation from the Network Functions Virtualization system; and
determining the coordinated decision according to the plurality of to-be-coordinated decisions and the correlation information.

15. The decision coordinator according to claim 14, wherein the program further includes instructions for determining the coordinated decision using big data analytics and according to the plurality of to-be-coordinated decisions and the correlation information.

16. An apparatus, comprising:
a processor; and
a non-transitory computer-readable storage medium storing a program to be executed by the processor, the program including instructions for:
obtaining a plurality of to-be-coordinated decisions for a target operation, wherein to-be-coordinated decisions of the plurality of to-be-coordinated decisions are separately generated by different entities of a plurality of entities in a Network Functions Virtualization system;
sending a decision coordination request message to a decision coordinator in the Network Functions Virtualization system, wherein the decision coordination request message comprises the plurality of to-be-coordinated decisions, and the decision coordination request message instructs the decision coordinator to determine a coordinated decision according to the plurality of to-be-coordinated decisions; and
a receiver, configured to receive a decision coordination response message from the decision coordinator, wherein the decision coordination response message comprises the coordinated decision.

17. The apparatus according to claim 16, wherein the plurality of to-be-coordinated decisions comprises a target decision;
wherein the program further includes instructions for:
obtaining correlation information of the target decision, and determining a feasibility of the coordinated decision according to the correlation information; and executing the coordinated decision when the coordinated decision is feasible, and skipping executing the coordinated decision when the coordinated decision is infeasible.

18. The apparatus according to claim 17, wherein the plurality of to-be-coordinated decisions are generated based on a preset policy by the plurality of entities in the Network Functions Virtualization system.

19. The apparatus according to a claim 17, wherein the apparatus further comprises a transmitter, configured to send indication information to each entity of the plurality of entities that makes one of the to-be-coordinated decisions of the plurality of to-be-coordinated decisions, wherein the indication information indicates an execution result of the coordinated decision.

* * * * *

UNITED STATES PATENT AND TRADEMARK OFFICE
CERTIFICATE OF CORRECTION

| | |
|---|---|
| PATENT NO. | : 10,567,196 B2 |
| APPLICATION NO. | : 15/481751 |
| DATED | : February 18, 2020 |
| INVENTOR(S) | : Yangbo Lin |

Page 1 of 1

It is certified that error appears in the above-identified patent and that said Letters Patent is hereby corrected as shown below:

On the Title Page

Item (63) Related U.S. Application Data, Line 2, delete "PCT/CT2015/080241" and insert --PCT/CN2015/080241--.

Signed and Sealed this
Eighteenth Day of August, 2020

Andrei Iancu
*Director of the United States Patent and Trademark Office*